Sept. 2, 1969  C. A. DEHNE  3,464,364
CONVEYOR SWITCH

Filed Feb. 7, 1966  2 Sheets-Sheet 2

INVENTOR.
CLARENCE A. DEHNE
BY
Farley, Forster & Farley
ATTORNEYS

United States Patent Office 3,464,364
Patented Sept. 2, 1969

3,464,364
CONVEYOR SWITCH
Clarence A. Dehne, Orchard Lake, Mich., assignor to Jervis B. Webb Company, a corporation of Michigan
Filed Feb. 7, 1966, Ser. No. 525,604
Int. Cl. E01b *25/26;* B61j *3/04;* B65g *35/06*
U.S. Cl. 104—96                    15 Claims

ABSTRACT OF THE DISCLOSURE

A switch for diverting a conveyor carrier propelled along one path by a forwarding pusher engaging a driving member on the carrier, in which a resetting member connected to the switch is engaged by the forwarding pusher after the carrier has been diverted to reset the switch to nondiverting position. The diverting surface of the switch defines part of the other path of travel when the switch is in nondiverting position so that resetting switch movement places the carrier driving member in position for engagement by a receiving pusher.

---

Figure 1:
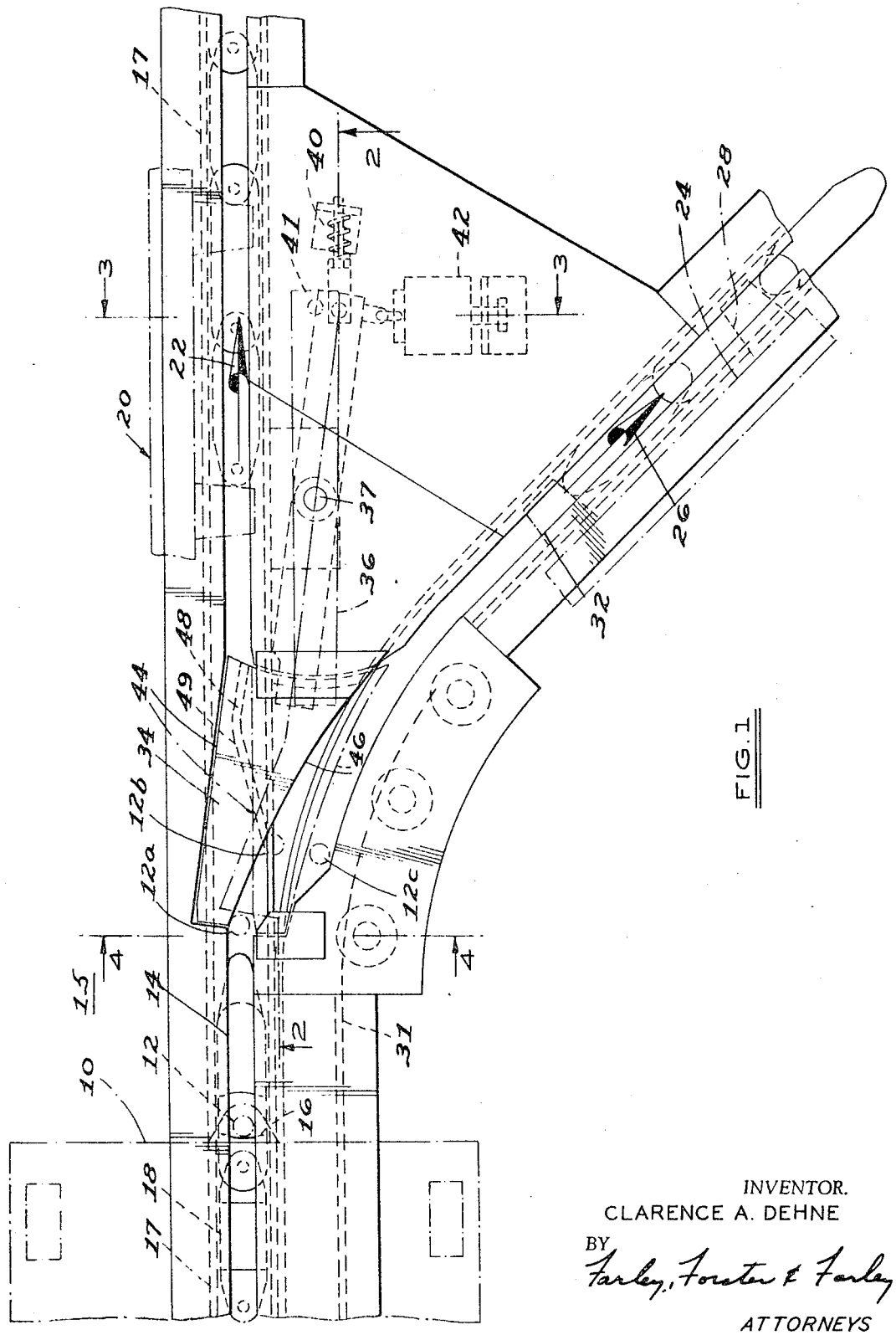

This invention relates to an improved switch construction for conveyors of the type in which a carrier having a driving member, is propelled by a pusher of a propelling member. Such conveyors include the floor truck tow line and overhead power and free types, all of which involve pusher driven carriers.

Switches conventionally employed for diverting a pusher driven carrier from one path of travel to another merely act on the carrier to change its path of travel as defined by carrier supporting tracks in the case of overhead power and free conveyors, or, in the case of floor truck tow lines, by a guide slot or guideway below or above the truck. When the path of travel is changed by the switch the driving member on the carrier loses engagement with the forwarding pusher propelling the carrier and the carrier then becomes unpowered. In installations where it is desired to transfer a carrier from a forwarding pusher line to a receiving pusher line, it is usually necessary to employ some auxiliary propelling device to positively move the carrier along a connecting path between the two propelling lines and insure that the carrier will be placed in a position where its driving member can be engaged by a pusher of the receiving propelling line.

The object of the present invention is to provide a switch construction which will function both to divert a carrier from one path of travel to another path of travel and which will positively position the carrier driving member in the latter path of travel; further, to provide a switch which will be moved from diverting to nondiverting position by power obtained from a propelling member.

According to one aspect of the invention, a conveyor having a main path of travel along which a carrier with a driving member is propelled by a pusher of a forwarding propelling member, a branch path of travel, and a switch selectively movable to a position to divert a carrier from the main to the branch path of travel, is characterized by means for resetting the switch to nondiverting position including an actuating member structurally interconnected with the switch, the actuating member having a cam surface which extends into the path of travel of the pusher of the forwarding propelling member for engagement thereby when the switch is in diverting position, the switch being moved to nondiverting position in response to such engagement. This provides a simple, more positive and effective way of resetting a switch particularly in comparison to constructions where the switch is reset by some form of mechanical actuator or by movement of a diverted carrier.

In the preferred construction the switch in nondiverting position forms a portion of the branch path of travel so that the resetting movement of the switch to nondiverting position results in positively positioning a diverted carrier in the branch path of travel.

Figure 2:
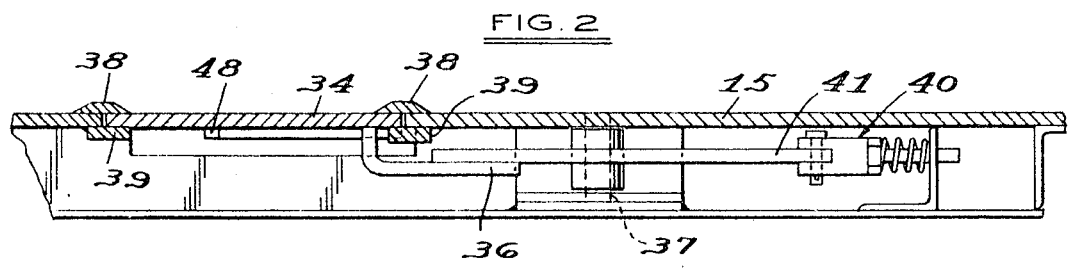
Figure 3:
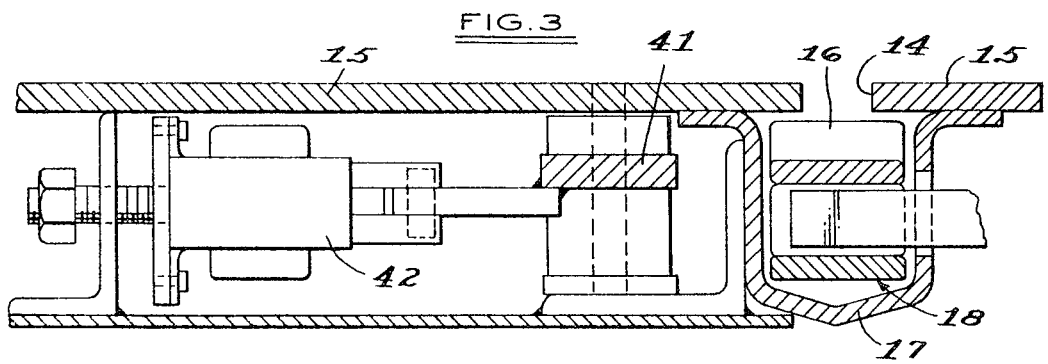
Figure 4:
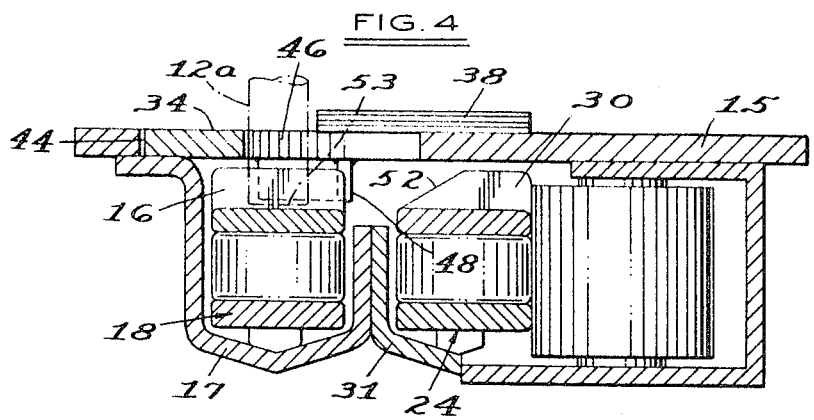

Other objects, features and advantages of the invention will appear from the following description of the representative embodiment disclosed in the accompanying drawings illustrating an application of the invention to a sub-floor tow line for floor trucks and in which:

FIGURE 1 is a plan view of a transfer zone between a forwarding tow line and a receiving tow line;

FIGURE 2 is a sectional elevation taken as indicated by the line 2—2 of FIG. 1; and FIGURES 3 and 4 are respectively enlarged sectional elevations taken as indicated by the lines 3—3 and 4—4 of FIG. 1.

Referring to FIG. 1, a conventional wheeled floor truck 10 equipped with a vertically movable drive pin 12 is propelled along a path of travel defined by a guide slot 14 in a supporting surface 15 by a pusher 16 on an endless chain travelling in a track 17 beneath the guide slot as shown in FIG. 4. The chain 18 is driven by a conventional caterpillar type drive unit 20, fragmentarily shown in FIG. 1, and for convenience will be referred to as the forwarding propelling member, with its direction of travel indicated by the arrow 22.

A similar endless chain 24, driven in the direction of the arrow 26 by a drive unit 28 and equipped with pushers 30, extends initially in side-by-side relation with the forwarding propelling member along a track section 31, and then diverges from the forwarding propelling member along a branch path of travel in vertical alignment with a branch guide slot 32. The chain 24 will be referred to as the receiving propelling member.

The switch construction of the invention is employed to divert a floor truck 10 from the main guide slot 14 to the branch guide slot 32 and to place the drive pin 12 of the diverted floor truck in position for engagement by a pusher 30 of the receiving propelling member. The switch construction consists of a plate-like tongue member 34 secured to an arm 36 which is mounted intermediate its ends on a pivot 37, and the tongue 34 is further supported by guide strips 38 and 39 secured to the upper and lower surfaces of the floor plate 15 as shown in FIG. 2. An over-center spring positioning device 40 is connected to the other end 41 of the arm 36 together with a switch actuating device 42 which as shown is a solenoid. Momentary energization of the solenoid 42 will cause pivotal movement of the switch arm 36 and tongue 34 from the main position shown in broken line to the branch position shown in full line, this movement being augmented by the over-center action of the spring device 40.

In the main position of the switch tongue, one side 44 thereof forms a portion of the main guide slot or path of travel 14, and the other side 46 of the tongue forms a portion of the branch path of travel or guide slot 32; while in the branch position of the switch tongue the diverting side 46 thereof extends across the main path of travel 14 and converges on the branch path of travel 32.

An actuating member 48 is structurally interconnected with the switch tongue 34 and consists of a bar secured to the underside of the tongue member 34 and shaped to form a cam surface 49 which, when the switch is in branch position as shown in full line in FIGS. 1 and 4, extends into the path of travel of a pusher 16 of the forwarding propelling member 18. The cam surface 49 is adapted, when engaged by a forwarding pusher 16, to produce resetting movement of the switch to main position in which the tongue member is then retained by the action of the over-center spring device 40. The tongue member 34 moves laterally with respect to the main and branch paths of travel when shifted from one position to another, since the pivot 37 is located remotely from the tongue member 34.

Operation of the switch is as follows: With the switch shifted to branch or diverting position by action of the solenoid 42, the drive pin 12 of a carrier being propelled toward the switch by a pusher 16 of the forwarding propelling member 18 engages the diverting side surface 46 of the tongue 34 as shown by the drive pin 12a in FIG. 1 and is moved along the surface 46 and laterally of the forwarding pusher 16 until the drive pin disengages from the pusher as shown by the position of the drive pin 12b in FIG. 1. The forwarding pusher 16 then engages the cam surface 49 of the actuating member 48 and power obtained from the forwarding propelling member 18 through a pusher 16 thereof is employed to impart resetting movement to the switch tongue and the side 46 thereof sweeps the carrier drive pin 12 into position for engagement by a pusher 30 of the receiving propelling member 24. This position of the drive pin is indicated at 12c in FIG. 1.

In order to prevent a jamming condition from the drive pin 12 being shifted laterally against a pusher 30 of the receiving propelling member, and to permit the receiving propelling member to be operated non-synchronously relative to the forwarding propelling member, the receiving pushers 30 are provided with cam means or a ramp-like side surface 52 facing the diverting surface 46 of the switch tongue and the forwarding pushers 16 as shown in FIG. 4. If a drive pin 12 is moved into the side of a receiving pusher 30, the lower end 53 of the drive pin will engage the ramp surface 52 and move upwardly, the drive pin returning by gravity to its lowered position for engagement with the next following receiving pusher 30 after the first-engaged pusher has moved on.

I claim:

1. A switch construction for a conveyor having a main path of travel along which a carrier with a driving member is propelled by a pusher of a forwarding propelling member, a branch path of travel, and a switch tongue movable to branch position to divert a carrier from the main to the branch path of travel characterized by means for resetting the switch tongue to main position including an actuating member structurally interconnected with the switch tongue, the actuating member having a cam surface which extends into the path of travel of a pusher of the forwarding propelling member for engagement thereby when the switch tongue is in branch position, the switch tongue being moved to main position in response to such engagement.

2. A switch construction as claimed in claim 1 wherein the switch tongue comprises a plate-like member, said actuating member being secured to the plate-like tongue member.

3. A switch construction as claimed in claim 1 wherein the switch tongue comprises a plate-like member, an arm having one end secured to the plate-like member, and means pivotally supporting the arm intermediate the ends thereof whereby the arm and plate-like member are movable between main and branch positions of the switch.

4. A switch for a conveyor having a main path of travel along which a carrier with a driving member is propelled by a pusher of a forwarding propelling member to divert a carrier from the main to a branch path of travel, characterized by the switch including a tongue member having main and branch side surfaces, means mounting the tongue member for movement between a main position in which the main and branch side surfaces form a portion of the main and branch paths of travel respectively, and a branch position in which the branch side surface extends into the main path of travel for engaging and diverting a carrier from the main path of travel, and power means for moving the tongue member from the branch position to the main position whereby a carrier engaging the branch side surface will be moved into the branch path of travel thereby in response to movement of the tongue member to the main position.

5. A switch as claimed in claim 4 further characterized by the power means for moving the tongue member including an actuating member structurally interconnected therewith, the actuating member having a cam surface which extends into the path of travel of a pusher of the forwarding propelling member for engagement thereby when the switch tongue is in branch position.

6. A switch as claimed in claim 5 wherein the actuating member is arranged so that the cam surface thereof is engaged by a pusher of the forwarding propelling member subsequent to the disengagement of the carrier driving member from such pusher by the diverting action of the branch side surface of the switch tongue.

7. A switch as claimed in claim 4 further characterized by the means mounting the tongue member for movement between main and branch positions including means pivotally supporting the tongue member on an axis displaced longitudinally from the main and branch side surfaces of the tongue member.

8. A conveyor including a carrier having a driving member;

forwarding and receiving propelling members each having pushers adapted to engage the carrier driving member;

means defining a path of carrier travel adjacent each of the propelling members;

and means for transferring a carrier driving member from a pusher of the forwarding propelling member to a pusher of the receiving propelling member at a transfer zone comprising a switch member having a diverting surface;

means mounting the switch member for movement between a diverting position in which the diverting surface thereof defines a path of carrier travel which extends into the path of travel of the carrier adjacent the forwarding propelling member and which converges on the path of travel of the carrier adjacent the receiving propelling member, and a nondiverting to nondiverting position whereby a carrier forms a part of the means defining the path of carrier travel adjacent the receiving propelling member;

and power means for moving said switch member from diverting to nondiverting position whereby a carrier disengaged from a pusher of the forwarding propelling member by contact with said diverting surface is moved by the switch member into a position for engagement by a pusher of the receiving propelling member.

9. A conveyor as claimed in claim 8 wherein the pushers of the receiving propelling member are provided with cam means on the side faces thereof adjacent the diverting surface of the switch member for moving a carrier driving member to nondriving position in response to engagement of the carrier driving member with said cam means.

10. A conveyor as claimed in claim 8 wherein the power means for moving said switch member from diverting to nondiverting position includes one of said forwarding and receiving propelling members.

11. A conveyor as claimed in claim 10 wherein the power means for moving said switch member from diverting to nondiverting position further includes an actuating member structurally interconnected with the switch member, the actuating member having a cam surface engageable by a pusher of the one propelling member.

12. A switch as claimed in claim 11 wherein the actuating member is secured to the tongue member.

13. A switch as claimed in claim 11 wherein the cam surface of the actuating member is arranged for engagement by a pusher of the forwarding propelling member subsequent to disengagement of the carrier driving member from such pusher as the carrier is diverted from the main path of travel by engagement with the diverting surface of the tongue member.

14. A conveyor as claimed in claim 8 wherein the power means for moving the switch member from diverting to nondiverting position comprises an actuating member structurally interconnected with the switch member, the actuating member having a cam surface engageable when the switch member is in diverting position by a pusher of the forwarding propelling member subsequent to the disengagement of the carrier from such pusher by contact with said diverting surface.

15. A conveyor as claimed in claim 8 wherein the means mounting the tongue member for movement includes means pivotally supporting the tongue member on an axis displaced longitudinally from the diverting surface of the tongue member.

References Cited
UNITED STATES PATENTS

| 3,103,183 | 9/1963 | Bradt | 104—178 X |
| 3,176,626 | 4/1965 | Hawkins | 104—130 |
| 3,254,609 | 6/1966 | Losey | 104—172 |
| 3,257,963 | 6/1966 | King | 104—178 |

ARTHUR L. LA POINT, Primary Examiner

D. F. WORTH III, Assistant Examiner

U.S. Cl. X.R.

104—178

PO-1050
(5/69)

UNITED STATES PATENT OFFICE
CERTIFICATE OF CORRECTION

Patent No. 3,464,364　　　　　　　　Dated September 2, 1969

Inventor(s) Clarence A. Dehne

It is certified that error appears in the above-identified patent and that said Letters Patent are hereby corrected as shown below:

Column 4, line 41, after "diverting" change
"to nondiverting position whereby a carrier"
to read
--position in which said diverting surface--

SIGNED AND
SEALED
DEC 23 1969

(SEAL)
Attest:

Edward M. Fletcher, Jr.
Attesting Officer

WILLIAM E. SCHUYLER, JR.
Commissioner of Patents